Sept. 25, 1945.  G. R. LOUTHAN  2,385,632
CENTRIFUGAL PROPELLING DEVICE
Filed April 19, 1943

INVENTOR.
GEORGE R. LOUTHAN

Patented Sept. 25, 1945

2,385,632

UNITED STATES PATENT OFFICE 2,385,632

CENTRIFUGAL PROPELLING DEVICE

George R. Louthan, Moline, Ill., assignor to Deere & Company, Moline, Ill., a corporation of Illinois Application April 19, 1943, Serial No. 483,710

10 Claims. (Cl. 198—128)

The present invention relates generally to centrifugal propelling devices and more particularly to warning means for centrifugal propelling devices, and has for its principal object the provision of means for giving advance warning that the delivery tube or conduit is becoming clogged, thereby enabling the operator to shut down and clear the obstruction before the device becomes jammed and possibly damaged.

The preferred embodiment of my invention, shown and described herein, relates to a device for elevating corn from the trough of a corn sheller to a duel sacking apparatus of conventional construction. The shelled kernels of corn are fed into an elevating fan, which propels the kernels upwardly through a conduit, which is provided with a generally U-shaped bend at the top, causing the corn to be directed downwardly to the sacking device. Air is introduced into the fan with the corn to assist in carrying the latter up through the conduit, the air being permitted to escape through the interstices of the sack fastened to one of the spouts of the sacking device. While one sack is being filled, the operator attaches another sack to the other spout, so that when the first sack is full, the stream of kernels can be diverted to the second sack, as is well known to those skilled in the art.

However, if the operator is inattentive, the first sack becomes filled after which the corn begins to build up in the sacking spout and in the discharge end of the bend, and finally falls back into the conduit and into the fan casing. If this is allowed to continue for a short time, the fan becomes clogged, probably resulting in damage to the fan.

It is, therefore, an object of my invention to provide warning means for calling the operator's attention to the fact that the sack is full. A further object relates to the provision of a second warning means calling attention to the fact that the corn is accumulating in the fan casing. Another related object has to do with the provision of an inspection opening in the duct adjacent the sacking device through which the operator can view the corn as it passes into the sacking device.

Trouble is sometimes encountered when the machine is started with an excess accumulation of corn in the fan casing which resulted from shutting the machine down while it was full of corn. Properly, the machine should not be shut down until it has cleared itself of shelled kernels. It is, therefore, an object of my invention to provide a warning means to call the operator's attention to an accumulation of kernels in the fan casing, which kernels are not being propelled upwardly out of the discharge conduit.

These, and other objects and advantages of my invention will be made apparent to those skilled in the art, after a consideration of the following description of one embodiment of my invention, reference being had to the drawing appended hereto, in which Figure 1 is an elevational view of a corn sheller equipped with a centrifugal propelling device embodying the principles of my invention;

Figures 1, 2, 3, 4:
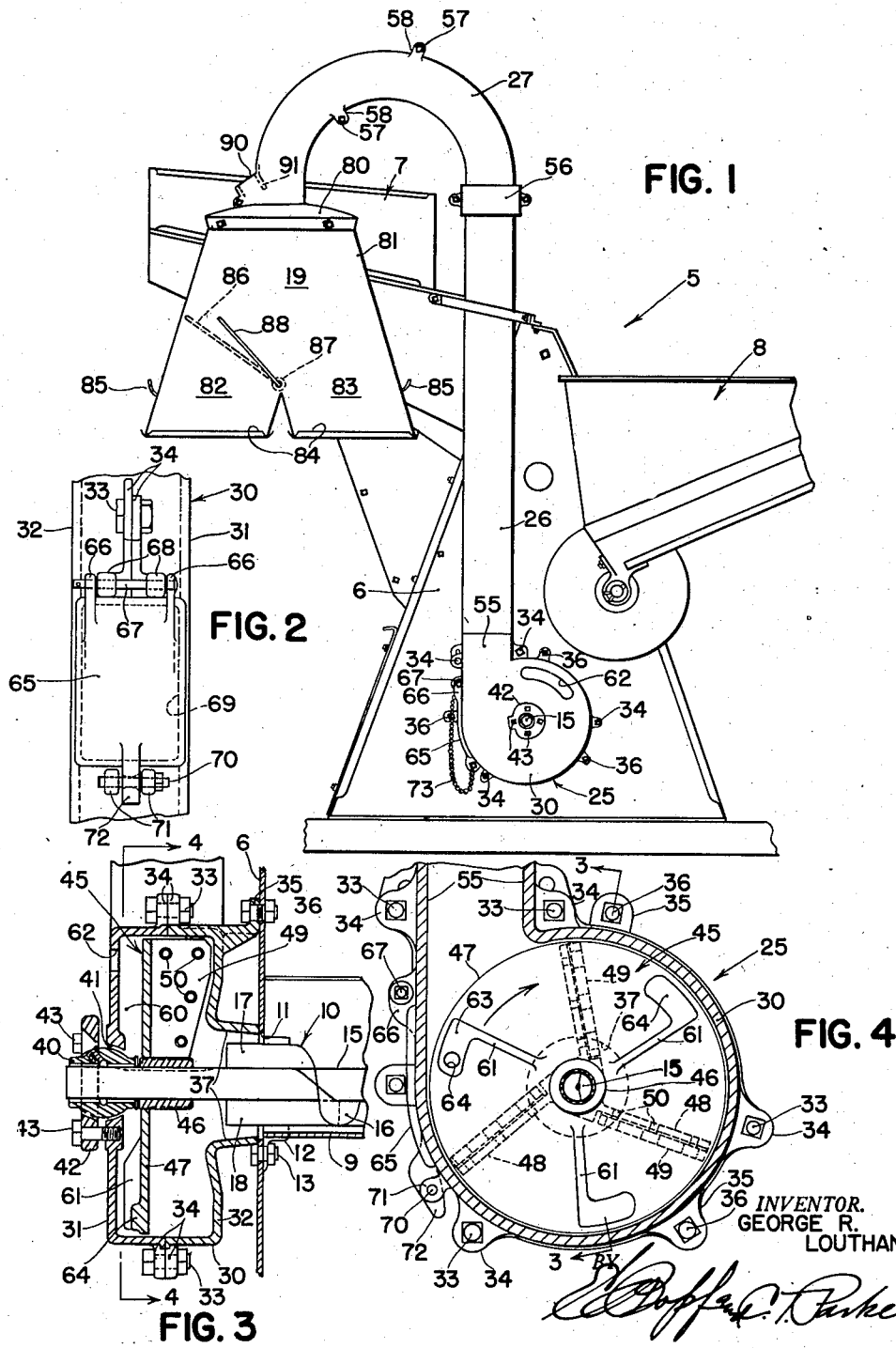
Figure 2 is an enlarged elevational view of one side of the elevating fan showing the clean-out door.
Figure 3 is an enlarged sectional elevational view taken along an approximately vertical plane through the center of the elevating fan and casing, as indicated by a line 3—3 in Figure 4.
Figure 4 is a sectional elevational view taken along a line 4—4 in Figure 3.

Referring now to the drawing, the corn sheller is indicated in its entirety by reference numeral 5 and includes a sheller housing 6 containing shelling and separating mechanism of any suitable design known to those skilled in the art, a feeder hopper 7 into which the ears of corn are placed and from which they are fed into the shelling mechanism, and a cob and trash conveyor 8, of conventional design. In the lower portion of the housing 6 is disposed a trough 9 (Figure 3), into which the shelled kernels fall from the shelling mechanism. An auger conveyor 10 is rotatably disposed in the trough 9 for moving the kernels longitudinally thereof out of an opening 11 in the wall of the housing 6 at the end of the trough 9. The latter is supported on a bracket 12, which is mounted on the inside of the housing 6 by bolts 13. The auger 10 comprises a shaft 15, on which is wound a helical vane 16 terminating in a straight portion 17 lying in an axial plane. Another axially extending blade 18, disposed diametrically opposite from blade 17, extends to a connection with the helical vane 16.

The centrifugal propelling device for raising the corn from the trough 9 to a sacking device 19 comprises a fan 25, a discharge conduit 26 extending upwardly therefrom, and a U-shaped conduit 27 at the upper end of the discharge conduit 26, for directing the corn downwardly to the sacking device 19, which is connected to the lower end of the bend or U-shaped portion 27.

The fan 25 comprises a generally cylindrical casing 30, preferably formed by a pair of complementary hollow castings 31, 32 secured together by bolts 33 passing through juxtaposed integrally cast lugs 34, which are apertured to receive the same. The casting 32 is provided with intergral supporting lugs 35, which are secured by bolts 36 to the wall of the housing 6, and also an intake passage 37 disposed generally coaxially of said casing in register with the housing opening 11.

The shaft 15 extends through the opening 11 and intake passage 37 and is rotatably supported in a bearing 40 of the self-aligning type, mounted in a socket 41 in the casting 31 and secured therein by a collar 42 fixed to the casting 31 by bolts 43. A rotor 45 is mounted in the casing 30 on the shaft 15 and comprises a hub 46 keyed or otherwise fixed to the shaft, a rotor body in the form of a disk 47 fixed to the hub 46 adjacent the outer end of the latter and disposed in a plane generally perpendicular to the axis of the shaft 15. A plurality of generally radially extending blades 48 are preferably cast integrally with the hub 46 and disk 47, and extend axially from the latter within the diameter of the disk. Each blade 48 is provided with a resilient pad 49 of rubber, rubberized fabric, or the like, fixed to the blade by rivets 50 or other suitable means. The resilient pads engage the kernels of corn or other material fed by the auger 10 into the casing 30 and throw the kernels outwardly by centrifugal force without cracking them.

The casing 30 is provided with a discharge throat 55 extending tangentially upwardly from the rotor, through which the corn or other material is thrown by the blades. The discharge conduit 26 is attached to the throat portion 55 of the casing and extends upwardly therefrom and is secured to one leg of the U-shaped duct 27 by a clamping collar 56. The U-shaped duct 27 is preferably made in the form of a pair of complementary castings split along an axial plane and secured together by bolts 57 extending through aligned apertured lugs 58.

Since the disk 47 is imperforate and substantially equals the interior diameter of the casing, the kernels of corn are normally engaged only by the pads 49 on the blades 48 and the outer wall of the fan casing 30. However, since there is a narrow space 60 within the casing between the disk and the outer wall, which is in communication with the discharge throat 55, it is evident that, in the event that the rotor fails to propel the corn upwardly through the bend 27, the corn will fall back into the casing 30 and a portion of this corn will fall into the space 60. These kernels are engaged by radially extending blades or ribs 61 fixed to the outer side of the disk 47 and preferably cast integrally therewith. These ribs carry the kernels upwardly and discharge them from an arcuate opening 62 in the upper portion of the wall of the casting 31, thereby giving visual warning to the operator that the device is not operating properly. During normal operation, the aperture 62 serves to admit air which assists in blowing the kernels up through the conduit 26.

A boss 63 is provided behind the outer end of each rib 61. These bosses serve to strengthen the ends of the ribs and also provide excess metal which can be removed for purposes of balancing the rotor, as indicated by the drilled recess 64.

The casing 30 is provided with a clean-out door 65 having a pair of hinge lugs 66 apertured to receive a hinge pin 67, which is supported in a pair of hinge lugs 68, fixed to the casing 30 and apertured in alignment with the hinge lugs 66 to receive the pin 67. Thus the door 65 swings outwardly to uncover an opening 69, in the casing, providing for cleaning the accumulated corn out of the casing. The door is secured in closed position by a bolt 70, which can be inserted through suitable aligned holes in a pair of lugs 71 on the casing and a lug 72 on the end of the door 65, when the latter is in closed position. A chain 73 is preferably attached to the bolt 70 to prevent the latter from being lost, although this is not essential. The other end of the chain 73 is attached to any suitable point, preferably to the hinge pin 67.

The discharge end of the U-shaped duct 27 is provided with a flange 80, to which is secured the sacking device 19 comprising a sheet metal hopper portion 81 having a pair of sacking spouts 82, 83 at the lower end thereof. Each spout is provided with an upwardly turned flange 84 extending around the lower end thereof for holding the sack (not shown) in the usual manner. The sack is attached by pulling the mouth over the flange 84 and then gathering in any slack and hooking the same over a hook 85 fixed to the spout above the flange 84.

The corn is directed into one spout or the other by means of a reversible damper or baffle 86 within the hopper 81, supported on a shaft 87. The latter extends out of the hopper wall and has a handle 88 fixed thereto. By throwing the handle to one side or the other, the damper 86 can be swung to either side, selectively, as known to those skilled in the art.

The U-shaped duct 27 is provided with an inspection opening 90 on the outer side of the discharge end, just above the supporting flange 80. A baffle 91 extends downwardly over the inspection opening to deflect the corn away from the latter during operation. The operator can look through the opening 90 to view the damper 86 and the corn or other material as it passes through the sacking device. However, in case the sacking device should become clogged or stopped, the air will blow out through the opening 90, together with a cloud of dust, thereby giving warning of the clogged condition.

During operation, the operator places sacks over both spouts 82, 83, and sets the damper 86 in either direction. Corn is fed by the auger 10 into the fan 25, which propels it up through the pipes 26, 27 into one of the sacks. The sack, being porous, permits the air to escape through the interstices therein, retaining the corn. However, when the sack becomes full, the air can no longer escape through the sacking spout and therefore blows out through the inspection opening 90. The air and dust warns the operator that the sack is full, whereupon he reverses the damper 86, causing the corn to be deposited in the empty sack. He then removes the full sack and replaces it with another empty sack. If he is not attentive, however, the corn builds up in the hopper 81 and the bend 27 until it begins to fall back into the fan casing 30. A portion of this corn will fall into the space 60 outside the disk 47 and will be propelled by the ribs 61 out of the opening 62 at high velocity, calling the operator's attention to the need for reversing the damper.

The machine should be initially started without any corn in the fan in order that the latter may be up to speed before introducing the corn. For this reason, the machine should not normally be shut down until the fan has cleared itself. If the machine is started while the fan is full of corn, it will probably be so clogged by incoming corn before sufficient speed has been attained to propel the corn over the bend, that damage to the propelling device is imminent. Warning of this condition is promptly given, however, by the kernels discharged from the opening 62, in time for the operator to shut down before damage is done. He then removes the bolt 70, opens the door 65, and cleans the excess corn out of the casing 30.

It will now be evident to those skilled in the art that this invention provides a simple but effective warning system, giving first and second warnings, successively, of a need for attention to this operation. I do not intend to limit my invention to the exact details shown and described herein, except as defined in the following claims.

I claim:

1. A centrifugal propelling device comprising in combination, a casing, a rotor mounted in said casing, means for feeding material into said casing axially of said rotor and a discharge duct extending tangentially upwardly from one side of said casing, said material being received at the center of said rotor and thrown by the latter upwardly through said duct, there being an aperture provided in said casing in the portion generally opposite said discharge duct and proximate to the periphery of the casing, through which aperture is discharged a portion of any material that is not properly propelled by said rotor through the discharge duct, thereby giving warning of said accumulation.

2. A centrifugal propelling device comprising in combination, a cylindrical casing disposed with its axis generally horizontal and having an axially disposed intake passage, a discharge duct extending tangentially upwardly at one side thereof and an aperture in the upper portion of said casing adjacent the outer periphery of said casing, and a rotor journaled for rotation within said casing substantially on said axis and adapted to receive material from said intake passage and normally propel it upwardly through said discharge duct, said aperture being positioned to discharge at least a portion of any material that falls back into said casing.

3. A centrifugal propelling device comprising in combination, a cylindrical casing disposed with its axis generally horizontal and having an axially disposed intake passage, a discharge duct extending tangentially upwardly at one side thereof and an aperture in an end wall of said casing above the axis and adjacent the outer periphery thereof, and a rotor journaled for rotation within said casing substantially on said axis and adapted to receive material from said intake passage and normally propel it upwardly through said discharge duct, said aperture being positioned adjacent the peripheral path of said rotor to discharge at least a portion of any material that is carried around with the rotor.

4. A centrifugal propelling device comprising in combination, a casing having intake and exhaust openings, a rotor journaled for rotation within said casing, said rotor comprising a wheel body having a plurality of generally radially extending propelling blades fixed on one side of said wheel body for propelling material from said intake through said discharge opening and at least one blade or rib on the other side of said wheel body for engaging material that intrudes between said body and the wall of said casing, the latter being apertured at a position adjacent the path of movement of the outer ends of said rib or blade to discharge such intruding material.

5. A centrifugal propelling device comprising in combination, a casing having intake and exhaust openings, a rotor journaled for rotation within said casing, said rotor comprising a wheel body adjacent one end wall of said casing and having a plurality of generally radially extending propelling blades fixed on one side of said wheel body and extending axially therefrom, and at least one rib on the opposite side of said wheel body for engaging material that intrudes between said body and the wall of said casing, the latter being apertured at a position adjacent the path of movement of the outer end of said rib to discharge such intruding material.

6. A centrifugal propelling device comprising in combination, a generally cylindrical casing, a rotor journaled in said casing substantially coaxial therewith, said rotor comprising a shaft, a disk mounted thereon and disposed adjacent one end wall of said casing, generally outwardly extending ribs on the side of said disk adjacent said end wall, and propelling blades on the opposite side of said disk, said casing having an intake opening in the other end wall adjacent said blades, a discharge opening in the peripheral wall in communication with both sides of said disk, and an aperture in said one end wall adjacent the outer ends of said ribs, through which material is discharged by said ribs in the event that material falls back into said casing through said discharge opening.

7. A centrifugal propelling device comprising in combination, a generally cylindrical casing, a rotor journaled in said casing substantially coaxial therewith, said rotor comprising a shaft, a disk mounted thereon and disposed adjacent one end wall of said casing, generally outwardly extending ribs on the side of said disk adjacent said end wall, and propelling blades on the opposite side of said disk, said casing having an intake opening generally coaxial with said rotor, a discharge duct connected with said casing in the upper portion of the peripheral wall of the latter through which material is propelled upwardly by said rotor and in communication with both sides of said disk, and an aperture in the upper portion of said one end wall adjacent the outer periphery of said casing, through which material is discharged by said ribs in the event that material falls back into said casing from said discharge duct, thereby serving as a warning that the device is not operating properly.

8. A centrifugal propelling device comprising in combination, a casing, a rotor mounted therein, a discharge duct extending generally tangentially upwardly from said casing and having a generally U-shaped bend therein for directing the material downwardly to a suitable point of discharge, said duct having an offset portion in the outer wall of said bend defining an inspection opening disposed in a plane inclined outwardly from the outer side of the duct toward the horizontal to provide a view downwardly into the duct, and a baffle in said duct extending in protective relation across said opening in the direction of travel of the material to normally prevent egress of material therethrough, said aperture permitting discharge of air and fine material.

9. For use with a centrifugal propelling device or the like, a generally upwardly extending discharge duct having a generally U-shaped bend therein for directing material downwardly to a suitable point of discharge, said duct having an offset portion defining an inspection opening in the outer portion of said bend, said opening being disposed in a plane inclined outwardly from the outer side of the duct toward the horizontal to provide a view downwardly into the duct, and a baffle in said duct extending in the direction of travel of the material to normally prevent egress of material therethrough but permitting a warning discharge of air and fine material when the discharge end of said duct becomes stopped.

10. For use with a centrifugal propelling device, a generally upwardly extending discharge duct having a generally U-shaped bend therein for directing material downwardly to a suitable point of discharge, said duct having an offset portion in the outer portion of said U-shaped duct below said bend therein defining an inspection opening in a plane inclined outwardly from the outer side of said duct toward the horizontal to provide a view downwardly into the downwardly discharging leg of said duct and also permitting a warning discharge of air and fine material when the discharge end of said duct becomes stopped.

GEORGE R. LOUTHAN.